United States Patent
Miyatake et al.

(10) Patent No.: US 6,447,931 B1
(45) Date of Patent: Sep. 10, 2002

(54) PLURAL LAYER COATING FILM-FORMING METHOD

(75) Inventors: Shinji Miyatake; Hidehiko Haneishi, both of Hiratsuka; Akira Tominaga, Chigasaki, all of (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 0 days.

(21) Appl. No.: 09/612,217

(22) Filed: Jul. 7, 2000

(30) Foreign Application Priority Data

Jul. 7, 1999 (JP) .............................. 11-192439

(51) Int. Cl.$^7$ .............................. C25D 13/12
(52) U.S. Cl. ................. 428/626; 204/484; 204/500
(58) Field of Search .............................. 204/484, 500; 428/626

(56) References Cited

U.S. PATENT DOCUMENTS

| | | | | |
|---|---|---|---|---|
| 4,147,679 A | * | 4/1979 | Scriven et al. | 204/507 |
| 4,988,420 A | * | 1/1991 | Batzill et al. | 204/484 |
| 5,770,642 A | * | 6/1998 | Kanato et al. | 204/505 |
| 6,190,523 B1 | * | 2/2001 | Tazzia | 204/484 |
| 6,214,188 B1 | * | 4/2001 | December | 204/489 |
| 6,248,225 B1 | * | 6/2001 | Palaika et al. | 204/484 |

* cited by examiner

*Primary Examiner*—K. Mayekar
(74) *Attorney, Agent, or Firm*—Wenderoth, Lind & Ponack, L.L.P.

(57) ABSTRACT

The present invention discloses a plural layer coating film-forming method comprising applying a cationically electrodepositable coating material (A) which provides a cured coating film having a volume resistivity value of $10^{12}$ Ω.cm or less on a coated article and then applying an anionically electrodepositable coating material (B) on a cured coating film surface thereof.

24 Claims, No Drawings

PLURAL LAYER COATING FILM-FORMING METHOD

The present invention relates to a novel plural layer coating film-forming method comprising electrodepositing in order a cationically electrodepositable coating material and an anionically electrodepositable coating material on a coated article.

It is publicly know that after a cationically electrodepositable coating material is applied on a coated article and then heated and cured, an intermediate coating material and a top coating material of an organic solvent base are applied in order by a spraying or electrostatic way to form a plural coating film. The plural coating film thus formed is excellent in a smoothness and employed in many fields. In recent years, however, it is strongly required to cut down use amounts of organic solvents in order to prevent environmental pollution and to elevate a coating efficiency for shortening the steps and save energy and labor.

An object of the present invention is to provide a novel plural layer coating film-forming method satisfying the requirements described above.

Intensive researches repeated by the present inventors have resulted in finding this time that the object described above can be achieved by applying a cationically electrodepositable coating material (A) showing a specific volume resistivity value on a coated article and applying an anionically electrodepositable coating material (B) on a cured coating film thereof to form a plural layer coating film, and they have come to complete the present invention.

Thus, provided according to the present invention is a plural layer coating film-forming method characterized by applying a cationically electrodepositable coating material (A) which provides a cured coating film having a volume resistivity value of $10^{12}$ $\Omega$.cm or less on a coated article and then applying an anionically electrodepositable coating material (B) on a cured coating film surface thereof.

A method for recoating twice electrodepositable coating materials to form a plural layer coating film include various methods excluding the method of the present invention described above, but it is difficult to achieve the object described above by any of them.

That is, a plural layer coating film formed by applying a cationically electrodepositable coating material on a heated and cured coating film of a cationically electrodepositable coating material is inferior in a weatherability, a finished appearance and a hardness as compared with those of a plural layer coating film formed by the method of the present invention. Also, a plural layer coating film formed by applying a cationically electrodepositable coating material on a heated and cured coating film of an anionically electrodepositable coating material is markedly inferior in a corrosion resistance and further inferior as well in a weatherability, a finished appearance and a hardness as compared with those of a plural layer coating film formed by the method of the present invention. Further, a plural layer coating film formed by applying an anionically electrodepositable coating material on a heated and cured coating film of an anionically electrodepositable coating material is markedly inferior in a corrosion resistance and further inferior as well in a finished appearance as compared with those of a plural layer coating film formed by the method of the present invention.

In contrast with this, the plural layer coating film formed by the method of the present invention is excellent in a finished appearance such as a smoothness and a glossiness and a coating film performance such as a weatherability and a corrosion resistance and provides the marked effect that application of a top coating material can be omitted.

The plural layer coating film-forming method of the present invention shall be explained below in further details.

Coated Article

A coated article to which the method of the present invention is applied shall not specifically be restricted as long as it has an electroconductive surface on which cationic electrodeposition coating can be carried out. The method of the present invention is particularly useful for coating on outside plate parts and inside plate parts of car bodies of passenger cars, buses, trucks and two wheelers.

Cationically Electrodepositable Coating Material (A)

The cationically electrodepositable coating material (A) is a coating material which can be electrodeposited directly on the coated article described above, and a cationically electrodepositable coating material which forms a coating film having a volume resistivity value of $10^{12}$ $\Omega$.cm or less is used therefor. To be specific, included is, for example, a cationically electrodepositable coating material which comprises a cationic resin and a conductive agent for controlling the volume resistivity value of the coating film in the range described above and which is prepared by mixing and dispersing these components in an aqueous medium.

Known resins usually used for a cationically electrodepositable coating material can be used for the cationic resin, and capable of being suitably used is, for example, a resinous composition comprising a base resin having a hydroxyl group and a cationizable group and a cross-linking agent such as a block polyisocyanate compound. The base resin used in this case includes, for example, reaction products of epoxy resins with cationizing agents; products obtained by protonating polycondensation products (refer to U.S. Pat. No. 2,450,940) of polycarboxylic acids and polyamines with acids; products obtained by protonating polyaddition products of polyisocyanate compounds, polyols and mono- or polyamines with acids; products obtained by protonating copolymers of acryl base or vinyl base monomers containing a hydroxyl group and an amino group with acids (refer to Japanese Patent Publication No. 12395/1970 and Japanese Patent Publication No. 12396/1970); and products obtained by protonating adducts of polycarboxylic acids to alkyleneimines with acids (refer to U.S. Pat. No. 3,403,088). Among them, a base resin obtained by reacting a cationizing agent with an epoxy resin obtained by reacting a polyphenol compound with epichlorohydrin is particularly preferred because of an excellent corrosion resistance thereof.

This epoxy resin has at least two epoxy groups in a molecule and has suitably a number average molecular weight falling in a range of 400 or more, particularly 400 to 4000, more particularly 800 to 2000 and an epoxy equivalent falling in a range of 190 to 2000, particularly 400 to 1000.

The polyphenol compound used for preparing the epoxy resin described above includes, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butyl-phenyl)-2,2-propane, bis(2-hydroxybutyl)methane, 1,5-dihydroxynaphthalene, bis(2,4-dihydroxyphenyl)methane, tetra(4-hydroxyphenyl)-1,1,2,2-ethane, 4,4'-dihydroxydiphenyl ether, 4,4'-dihydroxydiphenylsulfone, phenol novolak and cresol novolak.

These epoxy resins obtained by reacting the polyphenol compounds with epichlorohydrin can further be modified with acryl resins, polybutadiene, alkyd resins, polyester resins and polyamide resins.

The cationizing agent includes, for example, amine compounds such as primary amines secondary amines, tertiary amines and polyamines, and they are preferably reacted with almost all epoxy groups which are present in the epoxy resins. They are reacted with the epoxy groups to form cationizable groups such as a secondary amino group, a tertiary amino group and a quaternary ammonium salt group. Further, basic compounds such as ammonia, hydroxylamine, hydrazine, hydroxyethylhydrazine and N-hydroxyethylimidazoline used as a cationizing agent may be reacted with the epoxy groups to thereby form basic groups, and they may be protonated with acids to form cationizable groups.

A primary hydroxyl group introduced by reaction with alkanolamine which can be used as a cationizing agent is suited to a hydroxyl group in the base resin because of an excellent cross-linking reactivity with a block polyisocyanate compound (cross-linking agent).

The base resin has preferably a hydroxyl group equivalent falling in a range of 20 to 5000 mg KOH/g, particularly 50 to 3000 mg KOH/g and more particularly 100 to 1000 mg KOH/g and has particularly preferably a primary hydroxyl group equivalent falling in a range of 200 to 1000 mg KOH/g, particularly 300 to 900 mg KOH/g. On the other hand, the cationizable group is present preferably in an amount which is necessary for enabling the base resin to stably be dispersed in water, and it falls preferably in a range of usually 3 to 200, particularly 5 to 150 and more particularly 10 to 80 in terms of KOH (mg/g of solid matter) (amine value). Such base resin does not preferably contain free epoxy groups in principle.

On the other hand, the block polyisocyanate compound which is a cross-linking agent for three-dimensionally cross-linking and curing the base resin is obtained by blocking the isocyanate groups of the polyisocyanate compound having at least two isocyanate groups in a molecule with a blocking agent. When this block polyisocyanate compound is heated to a baking temperature of a coating film, the blocking agent is dissociated, and free isocyanate groups are reproduced. They are crosslink-reacted with active hydrogens such as hydroxyl groups contained in the base resin.

Known compounds can be used for the polyisocyanate compound and include, for example, aromatic diisocyanates such as tolylenediisocyanate, diphenylmetanediisocyanate, xylylenediisocyanate and naphthalenediisocyanate; aliphatic diisocyanates such as trimethylenediisocyanate, tetramethylenediisocyanate, hexamethylenediisocyanate, dimeric acid diisocyanate and lysine diisocyanate; alicyclic diisocyanates such as methylenebis(cyclohexylisocyanate), isophoronediisocyanate, methylcyclohexanediisocyanate, cyclohexanediisocyanate and cyclopentanediisocyanate; buret type adducts and isocyanuric ring type adducts of these polyisocyanates; and free isocyanate group-containing urethane prepolymers obtained by reacting these polyisocyanates with low molecular weight or high molecular weight polyols in an excess of the isocyanate groups Capable of being used as the blocking agent are known compounds of a phenol-type, lactam-type, alcohol-type, oxime-type, active methylene-type, mercaptan-type, acid amide-type, imide-type, amide-type, imidazole-type, imine-type and the like.

A use proportion of the base resin to the cross-linking agent such as the block polyisocyanate compound shall not strictly be restricted and can suitably be changed according to the kind of the base resin used. The proportion of the base resin falls suitably in a range of 50 to 90%, particularly 60 to 80%, and that of the cross-linking agent falls suitably in a range of 50 to 10%, particularly 40 to 20% each based on the total solid weight of both components.

The base resin can be water-dispersed by stirring and mixing with the cross-linking agent to neutralize the cationizable groups in the base resin with an acid compound such as acetic acid, formic acid, lactic acid and phosphoric acid and then mixing with an aqueous medium.

The conductive agent is used for controlling the volume resistivity value of the coating film of the cationically electrodepositable coating material (A) to $10^{12}$ Ω.cm or less and includes, for example, conductive materials such as granular or powdery carbon black, graphite, silver, copper, nickel and tin oxide. They can be used alone or in combination of two or more kinds thereof. A blending proportion of the conductive agent falls preferably in a range of 1 to 50 parts by weight, particularly 3 to 30 parts by weight per 100 parts by weight (solid matter) of the resin component.

A cured coating film formed from the cationically electrodepositable coating material (A) used in the present invention has to have a volume resistivity value falling in a range of $10^{12}$ Ω.cm or less, preferably $10^8$ to $10^3$ Ω.cm. If this volume resistivity value is larger than $10^{12}$ Ω.cm, the electrodepositable coating property of the anionically electrodepositable coating material (B) on the coated surface of the cationically electrodepositable coating material (A) is reduced, and even if can be coated, the coating film thereof tends to be reduced in a smoothness.

The volume resistivity value is measured according to JIS-K6911-1955, and "DSM-8103" manufactured by Toa Electronics Ltd. is used for the measuring instrument.

The cationically electrodepositable coating material (A) comprises, for example, a base resin, a cross-linking agent and a conductive agent and can be prepared by neutralizing the cationizable groups in the base resin with an acid compound such as acetic acid, formic acid, lactic acid and phosphoric acid and then dispersing in an aqueous medium. The resulting aqueous dispersion has a pH falling preferably in a range of 3 to 9, particularly 5 to 7 and a solid matter concentration falling suitably in a range of 5 to 30% by weight, particularly 10 to 25% by weight. The cationically electrodepositable coating material (A) can suitably be compounded with additives for a coating material, such as an extender pigment, a color pigment, a rust preventive pigment and a settling inhibitor.

In particular, in the cationically electrodepositable coating material (A), it is preferred that harmful substances such as a lead-containing compound are not used (lead free) as a rust preventive pigment, and a bismuth-containing compound such as bismuth hydroxide and bismuth lactate is added in place thereof The cationically electrodepositable coating material (A) can be applied by coating under the conditions of a bath temperature of 20 to 35° C., a voltage of 100 to 400 V, a current density of 0.01 to 5 A and a current running time of 1 to 10 minutes with a coated article being used as a cathode. The coating film thickness falls preferably in a range of 10 to 40 μm, particularly 15 to 30 μm in terms of a cured coating film. The coating film can be cross-linked and cured by heating at about 140 to about 190° C. for not much longer than 10 to 40 minutes.

Anionically Electrodepositable Coating Material (B)

The anionically electrodepositable coating material (B) is a coating material which is electrodeposited on the heated and cured coating film surface of the cationically electrodepositable coating material (A). To be specific, capable of being used is a known anionically electrodepositable coating material which comprises an anionic resin and is prepared by suitably mixing and dispersing it in an aqueous medium together with other components.

Capable of being used for the anionic resin are known resins usually blended with an anionically electrodepositable coating material, for example, resins having a carboxyl group and, if necessary, a hydroxyl group, and acryl resins and urethane resins having a carboxyl group are suitable. In particular, if acryl resins and urethane resins having a carboxyl group and a hydroxyl group are used for the anionic resin, the anionically electrodepositable coating material (B) provides a coating film having an excellent weatherability and smoothness, and therefore they are more suitable.

Further, polyester resins and vinyl resins having a carboxyl group and a hydroxyl group can be used as well for the anionic resin.

The anionic resin can be water-soluble or water-dispersible by neutralizing a carboxyl group contained therein with a basic compound such as ammonia; organic amines such as diethylamine, ethylethanolamine, diethanolamine, monoethanolamine, monopropanolamine, isopropanolamine, ethylaminoethylamine, hydroxyethylamine and diethylenetriamine; and alkaline metal hydroxides such as caustic soda and caustic potash.

Capable of being used as the acryl resins described above having a carboxyl group and a hydroxyl group are, for example, copolymers prepared by using carboxyl group-containing unsaturated monomers, hydroxyl group-containing acryl base monomers and, if necessary, other polymerizable monomers and radically polymerizing these monomers.

These monomers include the following ones.

Carboxyl Group-containing Unsaturated Monomers

They are compounds having each at least one carboxyl group and polymerizable unsaturated bond in a molecule and include, for example, (meth)acrylic acid, itaconic acid, maleic acid and caprolactone-modified carboxyl group-containing (meth)acryl base monomers (trade names, Praccel FM1A, Praccel FM4A and Praccel FM10A manufactured by Daicel Chemical Industries Ltd.).

Hydroxyl Group-containing Acryl Base Monomers

They are compounds having each at least one hydroxyl group and polymerizable unsaturated bond in a molecule and include, or example, hydroxyalkyl (meth)acrylates such as hydroxyethyl (meth)acrylate, hydroxypropyl (meth) acrylate and hydroxybutyl (meth)acrylate; (poly)alkylene glycol (meth)acrylates such as (poly)ethylene glycol mono (meth)acrylate and (poly)propylene glycol mono(meth) acrylate; and reaction products of these hydroxyl group-containing acryl base monomers with lactone compounds such as β-propiolactone, dimethylpropiolactone, butyrolactone, γ-valerolactone, γ-caprolactone, γ-caprylolactone, γ-laurylolactone, ε-caprolactone and δ-caprolactone. Commercially available products include Praccel FM1 (trade name, manufactured by Daicel Chemical Industries Ltd., caprolactone-modified (meth)acrylic acid hydroxyesters), Praccel FM2 (ditto) and Praccel FM3 (ditto), Praccel FA1 (ditto), Praccel FA2 (ditto) and Praccel FA3 (ditto).

Other Polymerizable Monomers

They are compounds which are other than the carboxyl group-containing unsaturated monomers and hydroxyl group-containing acryl base monomers described above and which have at least one polymerizable unsaturated bond in a molecule and include, for example, $C_1$ to $C_{18}$ alkyl or cycloalkyl esters of (meth)acrylic acid, such as methyl (meth)acrylate, ethyl (meth)acrylate, propyl (meth)acrylate, butyl (meth)acrylate, hexyl (meth)acrylate, octyl (meth) acrylate, lauryl (meth)acrylate and cyclohexyl (meth) acrylate; aromatic polymerizable monomers such as styrene, α-methylstyrene and vinyltoluene; (meth)acrylamides and derivatives thereof such as (meth)acrylamide, N-butoxymethyl(meth)acrylamide and N-methylol(meth) acrylamide; (meth)acrylonitrile compounds; and alkoxysilyl group-containing polymerizable monomers such as γ-(meth) acryloxypropyltrimethoxysilane, γ-(meth) acryloxypropylmethyldimethoxysilane, γ-(meth) acryloxypropyltriethoxysilane and vinyltrimethoxysilane.

In a blending proportion of these monomers, the carboxyl group-containing unsaturated monomers are used in such an amount that the copolymers thereof have an acid value falling preferably in a range of 10 to 200 mg KOH/g, particularly 20 to 100 mg KOH/g. The carboxyl group-containing unsaturated monomers are preferably used in a proportion falling in a range of about 3 to about 30% by weight, particularly about 4 to about 20% by weight based on the total weight of the monomers. The hydroxyl group-containing unsaturated monomers are preferably used in such an amount that the copolymers thereof have a hydroxyl group value falling in a range of 30 to 300 mg KOH/g, particularly 50 to 200 mg KOH/g. The hydroxyl group-containing unsaturated monomers are used in a proportion falling preferably in a range of about 3 to about 40% by weight, particularly about 5 to about 30% by weight based on the total weight of the monomers.

$C_1$ to $C_{18}$ alkyl or cycloalkyl esters of (meth)acrylic acid and aromatic monomers such as styrene are preferably used as the other polymerizable monomers, and the use amount of the other polymerizable monomers falls preferably in a range of about 37 to about 95% by weight, particularly about 60 to about 91% by weight based on the total weight of the monomers.

Conventionally known solution polymerization methods can be employed as a method for subjecting these monomers to a radical copolymerization reaction.

The acryl resins thus obtained have suitably a number average molecular weight falling in a range of usually 10000 or less, particularly 4000 to 8000.

The polyurethane resins having a carboxyl group and a hydroxyl group include, for example, resins obtained by subjecting polyisocyanate compounds, polyols and dihydroxycarboxylic acids to a urethane reaction in an equivalent ratio of hydroxy group excess by a one shot method or a multistage method.

The polyisocyanate compounds are compounds having two or more isocyanate groups in a molecule, and suitably used are, for example, aliphatic diisocyanates such as hexamethylenediisocyanate, trimethylhexanediisocyanate and lysine diisocyanate; and alicyclic diisocyanates such as cyclohexanediisocyanate, isophoronediisocyanate, dicyclohexylmethanediisocyanate and methylcyclohexylenediisocyanate.

The polyols are compounds having two or more hydroxyl groups in a molecule and include, for example, polyether diols obtained by polymerizing or copolymerizing (block or random) alkylene oxides (ethylene oxide, propylene oxide and butylene oxide) and/or heterocyclic ethers (tetrahydrofuran), for example, polyethylene glycols, polypropylene glycols, polyethylene-polypropylene (block or random) glycols, polytetramethylene ether glycols, polyhexamethylene ether glycols and polyoctamethylene ether glycols; polyester diols obtained by subjecting dicarboxylic acids (adipic acid, succinic acid, sebacic acid, glutaric acid, maleic acid, fumaric acid and phthalic acid) to condensation polymerization with glycols (ethylene glycol, propylene glycol, butanediol, hexanediol, neopentyl glycol and bishydroxymethylcyclohexane), for example, polyethylene adipate, polybutylene adipate, polyhexamethylene adipate, polyneopentyl adipate, polyethylene-butylene adipate and polyneopentyl-hexyl adipate; polylactone diols, for example, polycaprolactone diol and poly-3-valerolactone diol; polycarbonate diols; and mixtures comprising two or more compounds selected from these compounds. These polyols can have a number average molecular weight falling in a range of usually 500 or more, preferably 500 to 5000 and more preferably 1000 to 3000.

Further, polyols of a low molecular weight having two or more hydroxyl groups in a molecule and a number average molecular weight of less than 500 can be used as well for the polyols. To be specific, included are the glycols given as the raw materials for the polyester diols described above, and alkylene oxide low mole adducts (molecular weight: less than 500); trihydric alcohols, for example, glycerin, trimethylolethane and trimethylolpropane, and alkylene oxide low mole adducts thereof (molecular weight: less than 500); and mixtures comprising two or more compounds selected from these compounds.

In a system in which polyols having a number average molecular weight of usually 500 or more and polyols of a low molecular weight having a number average molecular weight of less than 500 are used in combination, the structural proportions of these both polyols fall preferably in a range of 80 to 99.9% by weight, particularly 90 to 99.5% by weight based on the total weight of both polyols in the case of the former and 20 to 0.1% by weight, particularly 10 to 0.5% by weight in the case of the latter.

The dihydroxycarboxylic acids are compounds having two hydroxyl groups and one carboxyl group in a molecule and include, for example, dimethylolacetic acid, dimethylolpropionic acid, dimethylollactic acid and dimethylolbutanoic acid.

The urethane reaction by the polyisocyanate compounds, the polyols and the dihydroxycarboxylic acids each described above can be carried out by conventionally known methods, and the resulting polyurethane resins having a carboxyl group and a hydroxyl group have preferably a number average molecular weight falling in a range of usually 1000 to 50000, particularly 2000 to 10000, an acid value falling in a range of 10 to 200 mg KOH/g, particularly 20 to 100 mg KOH/g and a hydroxyl group value falling in a range of 30 to 300 mg KOH/g, particularly 50 to 200 mg KOH/g.

In the anionically electrodepositable coating material (B), the cross-linking agent for the anionic resin component shall not specifically be restricted and includes, for example, a melamine resin, a block polyisocyanate compound and a polyoxazoline compound. Among them, the melamine resin is particularly preferably used.

Capable of being used for the melamine resin is an etherified melamine resin obtained by modifying a part or all of methylol groups of methylolmelamine prepared by reacting melamine with formaldehyde with at least one alcohol selected from monoalcohols of $C_1$ to $C_{10}$. Such melamine resin is preferably a resin in which polynuclear (about 2 to 5) bodies account for 50% by weight or more. An imino group, a methylol group and other functional groups may be contained in the melamine resin.

The block polyisocyanate compound is obtained by blocking the isocyanate groups of a polyisocyanate compound with a blocking agent. To be specific, the block polyisocyanate compounds given as the examples in the cationically electrodepositable coating material (A) can suitably be used. When these compounds are heated to a baking temperature of the coating film, a blocking agent is dissociated to reproduce a free isocyanate group, and it is subjected to a cross-linking reaction with active hydrogen of a hydroxyl group in the base resin contained in the anionically electrodepositable coating material (B).

The use proportion of the anionic resin to the cross-linking agent falls suitably in a range of 50 to 90% by weight, particularly 60 to 80% by weight in the case of the anionic resin and falls suitably in a range of 50 to 10% by weight, particularly 40 to 20% by weight each based on the total solid matter weight of both components in the case of the cross-linking agent.

In the present invention, particularly preferably used is the anionically electrodepositable coating material (B) containing an acryl resin having a carboxylic group and a hydroxyl group and a melamine resin in the proportion described above.

Further, capable of being used as the anionically electrodepositable coating material (B) are coating materials containing an anionic resin which is cross-linked and cured by irradiation with an energy ray such as a UV ray and an anionic resin which is cross-linked and cured by irradiation with a UV ray and heating.

Resins in which a carboxyl group and a polymerizable unsaturated bond are present in combination in a molecule can be used as the anionic resin which is cross-linked and cured by irradiation with an energy ray such as a UV ray (hereinafter referred to as a UV curable anionic resin).

The UV curable anionic resin includes, for example, water-soluble or water-dispersible resins having an unsaturation equivalent falling in a range of 400 or less, particularly 200 to 400 and an acid value falling in a range of 10 to 200 mg KOH/g, particularly 30 to 100 mg KOH/g, which are prepared by adding compounds having a polymerizable unsaturated bond and a glycidyl group to high acid value acryl resins having a carboxyl group.

The compounds having a polymerizable unsaturated bond and a glycidyl group in combination include, for example, glycidyl acrylate and glycidyl methacrylate.

The high acid value acryl resin having carboxyl group can be obtained by copolymerizing, for example, a carboxyl group-containing unsaturated monomer with an acryl base unsaturated monomer and, if necessary, other unsaturated monomers.

The carboxyl group-containing unsaturated monomer is a compound having each at least one carboxyl group and a polymerizable unsaturated bond and includes, for example, acrylic acid, methacrylic acid, maleic acid and itaconic acid.

The acryl base unsaturated monomer includes, for example, $C_1$ to $C_{18}$ alkyl or cycloalkyl esters of (meth) acrylic acid, such as methyl (meth)acrylate, ethyl (meth) acrylate, propyl (meth)acrylate, butyl (meth)acrylate, hexyl (meth)acrylate, octyl (meth)acrylate, lauryl (meth)acrylate and cyclohexyl (meth)acrylate.

The other unsaturated monomers include, for example, styrene, vinyltoluene, vinyl acetate, vinyl chloride, vinyl ether, acrylonitrile, hydroxyethyl acrylate, hydroxypropyl methacrylate and acrylamide.

The copolymerization reaction of the carboxyl group-containing unsaturated monomer with the acryl base unsaturated monomer and, if necessary, the other unsaturated monomers for obtaining the high acid value acryl resin can be carried out by known methods, for example, a solution polymerization method. The resulting copolymer has a number average molecular weight falling suitably in a range of 1000 to 10000, particularly 2000 to 8000 and an acid value falling suitably in a range of 20 to 400 mg KOH/g, particularly 30 to 200 mg KOH/g.

The UV curable anionic resin described above can be water-soluble or water-dispersible by neutralizing the carboxyl groups contained therein with a basic compound such as ammonia, organic amines and alkaline metal hydroxides each described above, preferably organic amines.

Preferably added as a photo polymerization initiator to the anionically electrodepositable coating material (B) containing the UV curable anionic resin in order to accelerate the cross-linking reaction of the coating film by irradiation with a UV ray are, for example, benzoin, benzoin methyl ether, benzoin ethyl ether, 2-methylbenzoin, benzil, benzyl dimethyl ketal, diphenyl sulfide, tetramethylthiuram monosulfide, diacetyl, eosin, thionine, Michler's ketone, anthracene, anthraquinone, acetophenone, α-hydroxyisobutylphenone, p-isopropyl-α-hydroxyisobutylphenone, α,α'-dichloro-4-phenoxyacetophenone, 1-hydroxy-1-cyclohexyacetophenone, 2,2-dimethoxy-2-phenylacetophenone, methyl benzoyl formate, 2-methyl-1-[4-(methylthio)phenyl]-2-morpholino-propene, thioxanthone, benzophenone, 2,2-dimethoxy-1,2-diphenylethane-1-one, 1-hydroxy-cyclohexylphenyl-ketone, benzophenone, 2-methyl-1-[4-(methylthio)phenyl]-2-morpholinopropanone-1,2-benzyl-2-dimethylamino-1-(4-morpholinophenyl)-butanone-1,2-hydroxy-2-methyl-1-phenyl-propane-1-one, 2,4,6-trimethylbenzoyldiphenylphosphine oxide, 1-[4-(2-hydroxyethoxy)-phenyl]-2-hydroxy-2-methyl-propane-1-one, bis(cyclopentadienyl)-bis(2,6-difluoro-3-(pyl-yl)titanium), 2-hydroxy-2-methyl-1-phenylpropane-1-one, bisacylphosphine oxide and ($\eta^5$-2, 4cyclopentadine-1-yl)[1,2,3,4,5,6-$\eta$)-(1-methylethyl) benzene]-iron(1+)-hexafluorophosphate(1−). The photo polymerization initiator is contained in a proportion falling suitably in a range of usually 0.1 to 10 parts by weight, particularly 0.5 to 5 parts by weight per 100 parts by weight of the UV curable anionic resin.

The anionically electrodepositable coating material (B) can suitably be further compounded with additives for a coating material, such as a pigment, a settling inhibitor and a hydrophilic organic solvent.

Capable of being used as the pigment are, for example, color pigments such as titanium oxide, zinc white, carbon black, cadmium red, molybdenum red, chromium yellow, chromium oxide, Prussian blue, cobalt blue, azo pigments, phthalocyanine pigments, quinacridone pigments, isoindoline pigments, threne base pigments and perylene pigments; extender pigments such as talc, clay, kaolin, baryta, barium sulfate, barium carbonate, calcium carbonate, silica and alumina white; and metallic pigments such as aluminum powder, mica powder and mica powder coated with titanium oxide. The pigment is suitably used in an amount falling in a range of usually 1 to 250 parts by weight, particularly 3 to 150 parts by weight per 100 parts by weight of the total solid matters of the anionic resin and the cross-linking agent.

The anionically electrodepositable coating material (B) can be applied by dipping a coated article as an anode, on which the cationically electrodepositable coating material (A) is applied and cured by heating in an electrodeposition bath containing the anionically electrodepositable coating material (B) controlled to a pH of 6 to 9, preferably 6.5 to 8, a bath concentration of 3 to 40% by weight, preferably 5 to 25% by weight and a bath temperature of 15 to 40° C., preferably 15 to 30° C. and applying a direct current having a fixed voltage of 1 to 400 V or applying a fixed voltage or current of 1 to 400 mA. In this case, a prescribed voltage or current may be applied from the beginning of running a current or a voltage or current may be gradually elevated up to a prescribed current or a prescribed voltage in one to 30 seconds. The current running time is suitably 30 seconds to 5 minutes, and the resulting film thickness falls preferably in a range of 5 to 100 μm, particularly 20 to 60 μm in terms of a cured coating film.

After electrodeposition, the coated article is drawn up from the electrodeposition bath and washed with water, and then the coating film of the anionically electrodepositable coating material (B) is cured, whereby the plural layer coating film according to the present invention can be formed.

The coating film can be cured by heating or irradiating with an active energy ray depending on the kind of the base resin contained in the anionically electrodepositable coating material or by heating and irradiating together. The heating condition can suitably be changed according to the kind of the anionic resin and/or the cross-linking agent, and suited is the condition of not much longer than 10 to 60 minutes at a temperature falling in a range of usually about 100 to about 200° C., preferably about 120 to about 180° C. On the other hand, the active energy ray includes, for example, a UV ray, a laser beam, an X-ray, an electron beam and an ion beam ray. Among them, a UV ray is preferably used, and the generating equipment thereof includes, for example, a mercury lamp, a high pressure mercury lamp, an extra-high pressure mercury lamp, a xenon lamp, a carbon arch, metal halide, a gallium lamp and a chemical lamp. An irradiation of a UV ray shall not specifically be restricted and falls preferably in a range of usually about 10 to 2000 mj/cm$^2$, and in the case of an electron beam, an irradiation of 1 to 20 Mrad is carried out at 50 to 300 Kev. The irradiating time thereof is suitably not much longer than 30 seconds to 5 minutes.

According to the present invention, a top coating material (C) can further be applied on the cured coating film of the anionically electrodepositable coating material (B) after applying the cationically electrodepositable coating material (A) and the anionically electrodepositable coating material (B) on the coated article in such a manner as described above.

This top coating material (C) includes, for example, a solid color coating material (C-1), a metallic coating material (C-2) and a clear coating material (C-3), and they can suitably be combined to form a top coating film.

To be specific, included is a method in which the solid color coating material (C-1) is applied in a 1 coat 1 bake system (1B1C) or the solid color coating material (C-1) or the metallic coating material (C-2) and the clear coating material (C-3) are applied in order in a 2 coat 1 bake system (1B2C) or a 2 coat 2 bake system (2B2C). Conventionally known coating materials can be used for the solid color coating material (C-1), the metallic coating material (C-2) and the clear coating material (C-3).

According to the plural layer coating film-forming method of the present invention described above, such effects as described below are obtained.

(1) Both the cationically electrodepositable coating material (A) and the anionically electrodepositable coating material (B) which are applied on the coated article are aqueous coating materials, and therefore environmental pollution caused by volatilization of organic solvents is solved.

(2) Both the cationically electrodepositable coating material (A) and the anionically electrodepositable coating material (B) are electrodeposited and therefore can evenly be coated on the whole coated surface in short time.

(3) The coating workability can be raised to achieve labor saving.

(4) The coating film of the anionically electrodepositable coating material (B) which is applied on the coated surface of the cationically electrodepositable coating material (A) is excellent in a smoothness, a glossiness and a weatherability, and therefore a coating film of a top coating material can be omitted.

The present invention shall be explained below in further details with reference to examples and comparative examples. Both parts and percentage are based a weight, and the thickness of the coating films is shown in terms of a cured coating film.

1. PREPARATION OF SAMPLES

1) Coated Article

A cold rolled dull steel plate having a size of 0.8×150×70 mm which is subjected to a surface treatment with "Palbond #3080" (trade name, a zinc phosphate surface treating agent, manufactured by Nihon Parkerizing Co., Ltd.).

2) Electrodepositable Coating Material a): Cationically Electrodepositable Coating Material for Undercoating A flask equipped with a stirrer, a thermometer, a nitrogen-introducing tube and a reflux condenser was charged with 518 parts of an epoxy resin having a number average molecular weight of 370 and an epoxy equivalent of 185 which was obtained by reacting bisphenol A with epichlorohydrin, and 57 parts of bisphenol A and 0.2 part of dimethylbenzylamine were further added to react them at 120° C. until the epoxy equivalent reached 250. Then, added were 213 parts of ε-caprolactone and 0.03 part of tetrabutoxytitanium, and the temperature was elevated up to 170° C. Sampling was carried out with the passage of time while maintaining this temperature to trace the amount of unreacted ε-caprolactone by measuring by means of an infrared absorption spectrum, and when the reaction rate reached 98% or more, 148 parts of bisphenol A and 0.4 part of dimethylbenzylamine were further added to react them at 130° C. until the epoxy equivalent reached 936. Then, added were 257.4 parts of methyl isobutyl ketone, 25.6 parts of diethylamine and 68.3 parts of diethanolamine to react them at 80° C. for 2 hours, and then the solution was diluted with 143.4 parts of ethylene glycol monobutyl ether to thereby obtain an amino group-modified epoxy resin vanish (i) having a resin solid content of 72% and an amino value (resin solid matter) of 54.5.

Mixed were 97 parts (70 parts in terms of a resin solid matter) of the vanish (i), 30 parts (solid matter) of a 2-ethylhexyl alcohol-blocked product of tolylenediisocyanate, 15 parts of a 10% acetic acid aqueous solution and 72.5 parts of a pigment paste (remark 1), and water was further added to obtain a cationically electrodepositable coating material (a) for undercoating. Solid matter content: 20%, pH: 6.1.

(Remark 1) pigment paste: a paste prepared by adding 5 parts (solid matter) of the vanish (i), 10 parts of a conductive agent ("Vulcan XC72", trade name, conductive carbon black, manufactured by Cabot Corp.), 3 parts of bismuth hydroxide, 3 parts of dioctyltin oxide and 35 parts of water and mixing and dispersing them.

b): Anionically Electrodepositable Coating Material for Top Coating (Hot Setting Type)

Blended were 118.6 parts (70 parts in terms of a solid matter) of an acryl resin solution (remark 2), 30 parts (solid matter) of a melamine resin ("Nikalac MX430", trade name, about 3 methoxy groups and about 3 butoxy groups per one nucleus of melamine, and a one nuclear body amount: about 57%, manufactured by Sanwa Chemicals Co., Ltd.), triethylamine (0.7 neutralization equivalent) and 40 parts of a pigment paste (remark 3), and then deionized water was added to dilute the solution, whereby an anionically electrodepositable coating material (b) for top coating was obtained. Solid matter content: 15%, pH: 8.3.

(Remark 2) acryl resin solution: dropwise added to 55 parts of isopropyl alcohol maintained at a temperature of 80° C. in 3 hours was a mixture comprising 15 parts of styrene, 38 parts of methyl methacrylate, 15 parts of n-butyl acrylate, 10 parts of ethyl acrylate, 15 parts of 2-hydroxyethyl acrylate, 7 parts of acrylic acid and 7 parts of azobisdimethylvaleronitrile, and then the solution was maintained at this temperature for one hour. Subsequently, one part of azobisdimethylvaleronitrile and 13 parts of butyl cellosolve were dropwise added, and the reaction was further continued at 80° C. for 4 hours to obtain an acryl resin solution having a solid content of 59%, an acid value of 55 mg KOH/g, a number average molecular weight of 6000 and a hydroxyl group value of 73 mg KOH/g.

(Remark 3) pigment paste: a paste prepared by adding 5 parts (solid matter) of the acryl resin solution (remark 2), 30 parts of a titanium oxide pigment, triethylamine (1.0 neutralization equivalent) and 35 parts of water and mixing and dispersing them.

c): Anionically Electrodepositable Coating Material for Top Coating (Hot Setting Type)

The same procedure as in b) described above was carried out to prepare an anionically electrodepositable coating material (c) for top coating, except that "93.3 parts (70 parts in terms of a solid matter) of a urethane resin solution" obtained in the following manner was substituted for "118.6 parts (70 parts in terms of a solid matter) of the acryl resin solution (remark 2)". Solid matter content: 15%, pH: 8.3.

Urethane resin solution: a reaction vessel equipped with a thermometer, a thermostat, a stirrer, a reflux condenser and a dropping device was charged with 995 parts of methyl isobutyl ketone as a solvent and then charged with 1400 parts of polypropylene glycol (number average molecular weight: 1100), 208 parts of neopentyl glycol and 268 parts of dimethylolpropionic acid, and the temperature was elevated up to 80° C., and then 1110 parts of isophoronediisocyanate was dropwise added at the same temperature in 60 minutes, followed by continuing the reaction until the isocyanate value became 1 or less (solid matter part), whereby an anionic urethane resin having a solid content of 75% was obtained. Number average molecular weight: 2500, acid value: 38 and hydroxyl group value: 67.

d): Anionically Electrodepositable Coating Material for Top Coating (UV Ray-curing Type)

A polymerizable unsaturated resin solution (remark 4) 300 parts was neutralized with triethylamine to 0.6 equivalent, and added to this solution was a mixed solution of 40 parts of a pigment paste (remark 5), 10 parts of "Irugacure 907" (trade name, a photo polymerization initiator, manufactured by Ciba Geigy Co., Ltd.) and 10 parts of propylene glycol monomethyl ether, followed by adding deionized water, whereby an anionically electrodepositable coating material (d) for top coating was obtained. Solid matter content: 15%, pH: 7.0.

(Remark 4) polymerizable unsaturated resin solution: a mixed solution comprising 25 parts of methyl methacrylate, 5 parts of n-butyl methacrylate, 70 parts of acrylic acid and 3 parts of azobisisobutyronitrile was dropwise added to 90 parts of propylene glycol monomethyl ether maintained at 110° C. in 3 hours under nitrogen gas atmosphere. Then, the solution was aged at the same temperature for one hour, and a mixed solution comprising 3 parts of azobisdimethylvaleronitrile and 10 parts of propylene glycol monomethyl ether was dropwise added thereto in one hour. The solution was further aged at the same temperature for 5 hours to obtain a solution of a high acid value acryl resin (acid value: 530 mg KOH/g). Next, 100 parts of glycidyl methacrylate, 0.08 part of hydroquinone monomethyl ether and 0.6 part of tetraethylammonium bromide were added to this solution, and they were reacted at 110° C. for 5 hours while blowing air to obtain a solution of a polymerizable unsaturated resin (acid value: 73 mg KOH/g, unsaturation equivalent: 285 and number average molecular weight: 8000).

(Remark 5) pigment paste: a paste prepared by adding 5 parts (solid matter) of the polymerizable unsaturated resin solution (remark 4), 30 parts of a titanium oxide white pigment, triethylamine (1.0 neutralization equivalent) and 35 parts of water and mixing and dispersing them.

e): Anionically Electrodepositable Coating Material for Undercoating (Comparison)

"Elecron #7200" (manufactured by Kansai Paint Co., Ltd., anionically electrodepositable coating material prepared by adding 100 parts (solid matter) of an unsaturated resin having an acid value of about 80 mg KOH/g obtained by reacting a polybutadiene/epoxy resin fatty acid ester/linseed oil mixture with maleic anhydride and 72.5 parts of a pigment paste (remark 6) and then adding deionized water; solid matter content: 13% and pH: 8.1).

(Remark 6) pigment paste: a paste prepared by adding 5 parts (solid matter) of the unsaturated resin, 10 parts of the conductive agent ("Vulcan XC72"), 3 parts of bismuth hydroxide, 3 parts of dioctyltin oxide and 35 parts of water and mixing and dispersing them.

f): Cationically Electrodepositable Coating Material for Top Coating (Comparison)

"Elecron KG2000" (manufactured by Kansai Paint Co., Ltd., white color base cationically electrodepositable coating material comprising principal components of an acetic acid-neutralized product of an amino group and hydroxyl group-containing acryl resin and a blocked product of aliphatic diisocyanate; solid content: 15% and pH: 5.2).

3. EXAMPLES AND COMPARATIVE EXAMPLES

Example 1

A coated article was dipped as a cathode in the cationically electrodepositable coating material (a) for undercoating at a bath temperature of 28° C., and a current was run at a voltage of 200 V for 3 minutes to carry out cationically electrodepositable coating. The article was drawn up, washed with water and then heated at 170° C. for 20 minutes to cure the coating film (film thickness: 20 μm) thereof. This cured electrodepositable coating film had a volume resistivity value of $10^8$ Ω.cm.

Then, this coated steel plate was dipped as an anode in the anionically electrodepositable coating material (b) for top coating, and a current was run at a voltage of 150 V for 3 minutes to carry out anionically electrodepositable coating. The plate was drawn up, washed with water and then heated at 170° C. for 20 minutes to cure the coating film (film thickness: 20 μm) thereof.

Example 2

A coated article was dipped as a cathode in the cationically electrodepositable coating material (a) for undercoating at a bath temperature of 28° C., and a current was run at a voltage of 200 V for 3 minutes to carry out cationically electrodepositable coating. The article was drawn up, washed with water and then heated at 170° C. for 20 minutes to cure the coating film (film thickness: 20 μm) thereof. This electrodepositable coating film had a volume resistivity value of $10^8$ Ω.cm.

Then, this coated steel plate was dipped as an anode in the anionically electrodepositable coating material (c) for top coating, and a current was run at a voltage of 150 V for 3 minutes to carry out anionically electrodepositable coating. The plate was drawn up, washed with water and then heated at 170° C. for 20 minutes to cure the coating film (film thickness: 20 μm) thereof.

Example 3

A coated article was dipped as a cathode in the cationically electrodepositable coating material (a) for undercoating at a bath temperature of 28° C., and a current was run at a voltage of 200 V for 3 minutes to carry out cationically electrodepositable coating. The article was drawn up, washed with water and then heated at 170° C. for 20 minutes to cure the coating film (film thickness: 20 μm) thereof. This cured electrodepositable coating film had a volume resistivity value of $10^8$ Ω.cm.

Then, this coated steel plate was dipped as an anode in the anionically electrodepositable coating material (d) for top coating, and a current was run at a voltage of 150 V for 3 minutes to carry out anionically electrodepositable coating. The plate was drawn up, washed with water, dried at a room temperature and then irradiated with a UV ray for 3 minutes by means of a high pressure mercury lamp of 3 kw to cure the coating film (film thickness: 20 μm) thereof.

Comparative Example 1

A coated article was dipped as a cathode in the cationically electrodepositable coating material (a) for undercoating at a bath temperature of 28° C., and a current was run at a voltage of 200 V for 3 minutes to carry out cationically electrodepositable coating. The article was drawn up, washed with water and then heated at 170° C. for 20 minutes to cure the coating film (film thickness: 20 μm) thereof. This cured electrodepositable coating film had a volume resistivity value of $10^8$ Ω.cm.

Then, this coated steel plate was dipped as a cathode in the cationically electrodepositable coating material (f) for top coating, and a current was run at a voltage of 150 V for 3 minutes to carry out cationically electrodepositable coating. The plate was drawn up, washed with water and then heated at 170° C. for 20 minutes to cure the coating film (film thickness: 20 μm) thereof.

Comparative Example 2

A coated article was dipped as an anode in the anionically electrodepositable coating material (e) for undercoating at a bath temperature of 28° C., and a current was run at a voltage of 200 V for 3 minutes to carry out anionically electrodepositable coating. The article was drawn up, washed with water and then heated at 170° C. for 20 minutes to cure the coating film (film thickness: 20 μm) thereof. This cured electrodepositable coating film had a volume resistivity value of $10^8$ Ω.cm.

Then, this coated steel plate was dipped as an anode in the anionically electrodepositable coating material (b) for top coating, and a current was run at a voltage of 150 V for 3 minutes to carry out anionically electrodepositable coating.

The plate was drawn up, washed with water and then heated at 170° C. for 20 minutes to cure the coating film (film thickness: 20 μm) thereof.

Comparative Example 3

A coated article was dipped as an anode in the anionically electrodepositable coating material (e) for undercoating at a bath temperature of 28° C., and a current was run at a voltage of 200 V for 3 minutes to carry out anionically electrodepositable coating. The article was drawn up, washed with water and then heated at 170° C. for 20 minutes to cure the coating film (film thickness: 20 μm) thereof. This cured electrodepositable coating film had a volume resistivity value of $10^8$ Ω.cm.

Then, this coated steel plate was dipped as a cathode in the cationically electrodepositable coating material (f) for top coating, and a current was run at a voltage of 150 V for 3 minutes to carry out cationically electrodepositable coating. The plate was drawn up, washed with water and then heated at 170° C. for 20 minutes to cure the coating film (film thickness: 20 μm) thereof

4. TEST RESULTS OF COATING FILM PERFORMANCE

The coated steel plates formed in the examples and the comparative examples described above were used to carry out the performance tests of the plural layer coating films. The results thereof are described in Table 1.

TABLE 1

|  | Example | | | Comparative Example | | |
| --- | --- | --- | --- | --- | --- | --- |
|  | 1 | 2 | 3 | 1 | 2 | 3 |
| Corrosion resistance | 1.0 | 1.0 | 1.0 | 1.0 | 3.5 | 3.0 |
| Weatherability | 90 | 90 | 90 | 50 | 90 | 50 |
| Surface roughness | 0.20 | 0.20 | 0.20 | 0.35 | 0.30 | 0.40 |
| Pencil scratch test | 3H | 3H | 3H | F | 3H | F |
| Glossiness | 80 | 80 | 80 | 60 | 75 | 60 |

The performance test methods in Table 1 are described below.

Corrosion Resistance

The plural layer coating film was crosscut by means of a cutter so that it reached the base, and this was subjected to a salt water spray resistance test for 840 hours according to JIS Z-2371 to observe a width (mm) of rust and blister generated from the cut part.

Weatherability

A gloss holding rate was observed after a test for 1000 hours by means of a sunshine weather meter.

Surface Roughness

Carried out according JIS B-0601-1982. The surface roughness in terms of a center line average roughness (Ra) μm was measured by means of "Surfcom 550A" manufactured by Tokyo Seimitsu Ltd.

Pencil Scratch Test

Carried out according JIS K-5400-1982 (8. 4. 2). The surface of the plural layer coating film was rubbed while changing a hardness of the lead of a pencil to determine the hardness of the hardest lead of the pencil which does not produce scratches.

Glossiness

20° mirror reflectivity (%)

What is claimed is:

1. A plural layer coating film-forming method which comprises applying a cationically electrodepositable coating material (A) which contains a bismuth-containing compound, and which provides a cured coating film having a volume resistivity value of $10^{12}$ Ω.cm or less on a coated article and then applying an anionically electrodepositable coating material (B) on a cured coating film surface thereof.

2. The method as described in claim 1, applying the cationically electrodepositable coating material (A) which provides a cured coating film having a volume resistivity value falling in a range of $10^8$ to $10^3$ Ω.cm.

3. The method as described in claim 1, wherein the cationically electrodepositable coating material (A) contains a conductive agent.

4. The method as described in claim 3, wherein the conductive agent is selected from the group consisting of granular or powdery carbon black, graphite, silver, copper, nickel and tin oxide.

5. The method as described in claim 3, wherein the conductive agent is contained in an amount falling in a range of 1 to 50 parts by weight per 100 parts by weight (solid matter) of the resin component.

6. The method as described in claim 1, wherein the cationically electrodepositable coating material (A) comprises a cationic resin prepared by neutralizing an amine-modified epoxy resin obtained by reacting an epoxy resin with an amine compound with an acid compound and a block polyisocyanate compound as a cross-linking agent.

7. The method as described in claim 6, wherein the amine-modified epoxy resin has a hydroxyl group equivalent falling in a range of 20 to 5000 mg KOH/g.

8. The method as described in claim 1, wherein the cationically electrodepositable coating material (A) is a lead-free coating material.

9. The method as described in claim 1, wherein the cationically electrodepositable coating material (A) has a coating film thickness falling in a range of 10 to 40 μm.

10. The method as described in claim 1, wherein the anionically electrodepositable coating material (B) comprises an anionic resin prepared by neutralizing a resin having a carboxyl group and, optionally, a hydroxyl group with a basic compound and a cross-linking agent.

11. The method as described in claim 10, wherein the carboxyl group-containing resin is an acryl resin.

12. The method as described in claim 11, wherein the carboxyl group-containing acryl resin further contains a hydroxyl group.

13. The method as described in claim 12, wherein the carboxyl group-containing acryl resin has an acid value falling in a range of 10 to 200 mg KOH/g and a hydroxyl group value falling in a range of 30 to 300 mg KOH/g.

14. The method as described in claim 10, wherein the carboxyl group-containing resin is a polyurethane resin.

15. The method as described in claim 14, wherein the carboxyl group-containing polyurethane resin further contains a hydroxyl group.

16. The method as described in claim 15, wherein the carboxyl group-containing urethane resin has an acid value falling in a range of 10 to 200 mg KOH/g and a hydroxyl group value falling in a range of 30 to 300 mg KOH/g.

17. The method as described in claim 10, wherein the cross-linking agent is a melamine resin.

18. The method as described in claim 1, wherein the anionically electrodepositable coating material (B) comprises an anionic resin which is cross-linked and cured by irradiation with an active energy beam.

19. The method as described in claim 18, wherein the anionic resin is prepared by adding a compound having a polymerizable unsaturated bond and a glycidyl group to a carboxyl group-containing high acid value acryl resin.

20. The method as described in claim 18, wherein the anionically electrodepositable coating material (B) further comprises a photo polymerization initiator.

21. The method as described in claim 1, wherein the anionically electrodepositable coating material (B) has a coating film thickness falling in a range of 5 to 100 μm.

22. The method as described in claim 1, wherein a top coating material is further applied on the cured coating film surface of the anionically electrodepositable coating material (B).

23. The method as described in claim 1, wherein the amine-modified epoxy resin has a primary hydroxyl group equivalent falling in a range of 200 to 1000 mg KOH/g.

24. An article coated by the method as described in claim 1.

* * * * *